United States Patent [19]

Cohen et al.

[11] Patent Number: 4,685,563

[45] Date of Patent: Aug. 11, 1987

[54] PACKAGING MATERIAL AND CONTAINER HAVING INTERLAMINATE ELECTROSTATIC SHIELD AND METHOD OF MAKING SAME

[75] Inventors: Philip S. Cohen, Cincinnati; Robert E. Schnittger, Jr., West Chester, both of Ohio

[73] Assignee: Michelman Inc., Cincinnati, Ohio

[21] Appl. No.: 676,831

[22] Filed: Nov. 30, 1984

Related U.S. Application Data

[63] Continuation of Ser. No. 494,630, May 16, 1983, abandoned.

[51] Int. Cl.$^4$ ............................................. B65D 73/02
[52] U.S. Cl. ..................................... 206/328; 428/924
[58] Field of Search ............... 206/328; 428/922, 215, 428/924; 361/220, 212

[56] References Cited

U.S. PATENT DOCUMENTS

| | | | |
|---|---|---|---|
| 4,160,503 | 7/1979 | Ohlbach | 206/328 |
| 4,211,324 | 7/1980 | Ohlbach | 206/328 |
| 4,293,070 | 10/1981 | Ohlbach | 206/328 |
| 4,424,900 | 1/1984 | Petcavich | 206/328 |
| 4,471,872 | 9/1984 | Dedow | 206/328 |

Primary Examiner—Joseph Man-Fu Moy
Attorney, Agent, or Firm—Frost & Jacobs

[57] ABSTRACT

A packaging material has a continuous interlaminate conductive coating to shield against electrostatic potential. The interlaminate position protects the physical integrity of the coating and avoids multiple problems and expenses associated with surface coatings. A container having closed faces is formed from the material to form a Faraday cage.

9 Claims, 8 Drawing Figures

PACKAGING MATERIAL AND CONTAINER HAVING INTERLAMINATE ELECTROSTATIC SHIELD AND METHOD OF MAKING SAME

This is a continuation, of application Ser. No. 494,630, filed May 16, 1983 now abandoned.

TECHNICAL FIELD

The present invention relates to packaging material and containers formed therefrom and more particularly concerns packaging material for forming a container for semiconductor components or other electrostatically sensitive goods. The broad aspects of the invention are applicable to a wide variety of packaging materials and will be specifically disclosed in connection with a corrugated panel having a protected interlaminate conductive coating to shield electrostatically sensitive goods from induced electrical potential. The corrugated panel is designed to be erected into a container with the interlaminate coating forming a Faraday cage to completely surround an enclosed article.

BACKGROUND OF THE INVENTION

In recent years, there has been significant activity in the protection of electrostatically sensitive components from electrostatic discharge during manufacture and transport. Many semi-conductor devices, for example, are electrostatically sensitive and will fail when a low current electrical potential difference is placed across their leads. Such devices have high impedance and the discharge of static electricity causes a breakdown of the gate oxide. Electrostatic potential across the leads of an electronic component may occur directly or indirectly by induction or capacitance charge in the immediate environment.

In order to protect such electrostatically sensitive components during transport and storage, a number of different package arrangements have been previously proposed. In general, these arrangements are designed to either dissipate an electrostatic charge by providing a conductive path between the sensitive component and the ground potential and/or shielding the component from induced potentials in a Faraday cage type construction.

In constructing a Faraday cage type container, an electrostatic shield is configured to completely surround an electrostatically sensitive component to prevent penetration of an induced electrostatic charge. Several types of Faraday cage type containers have been used in the past. One such container is a molded plastic material impregnated with a conductive material such as carbon black. The impregnated carbon black particles form an electrostatic shield which surrounds a sensitive component to be protected. In some instances, plastic has been molded about a wire mesh screen which served as an equipotential surface protecting the enclosed device.

A further Faraday cage type container is disclosed in U.S. Pat. No. 4,241,829 to Hardy. In the Hardy arrangement, a conductive material, such as carbon and graphite, is sprayed or brushed onto the surface of a container to form a continuous equipotential shield for enclosing an electrostatically sensitive component.

A similar but substantially less expensive type of Faraday cage is disclosed in U.S. Pat. Nos. 4,160,503; 4,211,324 and 4,293,070 to Ohlbach. Ohlbach applies a coating of carbon black material onto the exposed exterior surface of a corrugated board through a printing process and thereafter erects a container from the board so that all inside surfaces of the container are coated. When the container is closed, the carbon black coated surfaces completely surround the container contents, protecting any electrostatically sensitive components disposed in the closed container.

Although containers formed with surface coated corrugated panels have been successful, such containers are not without disadvantages. When the carbon black or other conductive material is applied to a surface, the coating is unprotected against physical contact during manufacture and shipment of the panel as well as during the erection and loading of a resulting container. Consequently, the physical integrity of the conductive coating is threatened by abrasion or puncture during all of these processes.

Also, it has become customary in the corrugated container industry to apply graphics and/or decorative coatings to the surface of the containers. The presence of a carbon black conductive coating interferes with and severely limits this practice. Although coating only one side of the panels with conductive coating and erecting a container so that the coating is only on the inside surfaces alleviates the problem of applying graphics to outside surfaces, it further complicates the erection process, since panels have a required orientation and are not reversible.

The application of a carbon black or other conductive coating to only the inside surfaces of a container is advantageous in that it avoids the problems associated with the coating rubbing off during handling and transport. However, coating the inside container surfaces also exposes the packaged article to the coating and increases the possibility of contaminating the packaged article. In order to reduce this possibility, various anti-rub additives have been added to coating formulations. Unfortunately, such anti-rub additives are not totally effective and tend to reduce the ability of resin glues to bond with the corrugated panels during the erection of a container. Furthermore, anti-rub additives further increase the cost of the coating and the resulting container.

The cost of a coated packaging material is also increased when the coating is applied in a printing process, since printing equipment is relatively expensive. Furthermore, when the packaging material includes corrugated board, printing equipment is not easily integrated into conventional machinery. The typical arrangement of a corrugating machine includes components densely packed and laid out in a continuous line. This typical arrangement does not readily afford space to install and operate a printing type applicator. Consequently, prior art methods of applying conductive coatings require a special coating operation separate and distinct from the process of manufacturing the actual corrugated board, thus adding considerably to the cost of conductive coated containers substantially limiting their ready availability.

SUMMARY OF THE INVENTION

Accordingly, it is an object of the present invention to provide a packaging material having an electrostatic shield protected against physical damage.

It is another object of the present invention to provide an electrostatically shielded container material which permits unlimited use of graphics or decorative coloring on all surfaces.

Yet another object of the present invention is to eliminate the possibility of conductive coating particles contaminating an enclosed good in an electrostatically shielded package.

A still further object of the present invention is to provide an electrostatic shield in a packaging material which is totally protected against coating rub-off without the necessity and expense of often ineffective anti-rub additives.

Still another object of the present invention is to provide an electrostatic shield for a packaging material which does not necessitate printing ink equipment for application.

It is a still further object of the present invention to apply an electrostatic coating for packaging material in an inexpensive manner with equipment readily installable in a conventional machinery.

It is yet another object of the present invention to provide a packaging material which is completely reversible wherein either side of the material may be used as the inside or outside of a resulting container.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

In order to achieve the foregoing and other objects, and in accordance with the purposes of the present invention as described herein, an improved packaging material is provided for protecting electrostatically sensitive components from electrostatic potential. The packaging material is a laminated structure including at least first and second laminae with interlaminate sides secured about each other.

In accordance with the broad aspects of the invention, a continuous electrically conductive coating is disposed between the first and second laminae. The first and second laminae thus isolate and protect the physical integrity of the interlaminate coating.

In a specific aspect of the invention, the first and second laminae are paperboard and a corrugated flute is interposed therebetween. The corrugated flute may also be formed of paperboard.

In one aspect of the invention, the continuous conductive coating is applied to an interlaminate side of at least one of the laminae. In a more specific aspect, the conductive coating is applied against an interlaminate side of both the first and second laminae.

In another aspect of the invention, a continuous coating is applied to a corrugated flute interposed between first and second laminae.

A still further aspect of the invention includes a Faraday cage container for completely surrounding an interior space with a plurality of panels having a continuous interlaminate conductive coating.

According to a further specific aspect of the invention, the conductive coating includes carbon black.

In yet another aspect of the invention, a method of forming a laminated container having an interlaminate electrostatic shield includes the application of a continuous conductive coating to one side of a first continuous lamina. A second lamina is secured to the second side of the first lamina to form a laminated panel with the conductive coating disposed in a protected position between the secured laminae. The laminated panel is formed into a container having closed faces to completely enclose the container contents so that the conductive coating forms a Faraday cage about the container contents.

Still other objects of the present invention will become readily apparent to those skilled in this art from the following description wherein there is shown and described a preferred embodiment of this invention, simply by way of illustration of one of the best modes contemplated for carrying out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principles of the invention. In the drawings.

Reference will now be made in detail to the preferred embodiment of the invention, an example of which is illustrated in the accompanying drawings.

DETAILED DESCRIPTION OF THE PREFERRED EMBODIMENT

Figure 1:
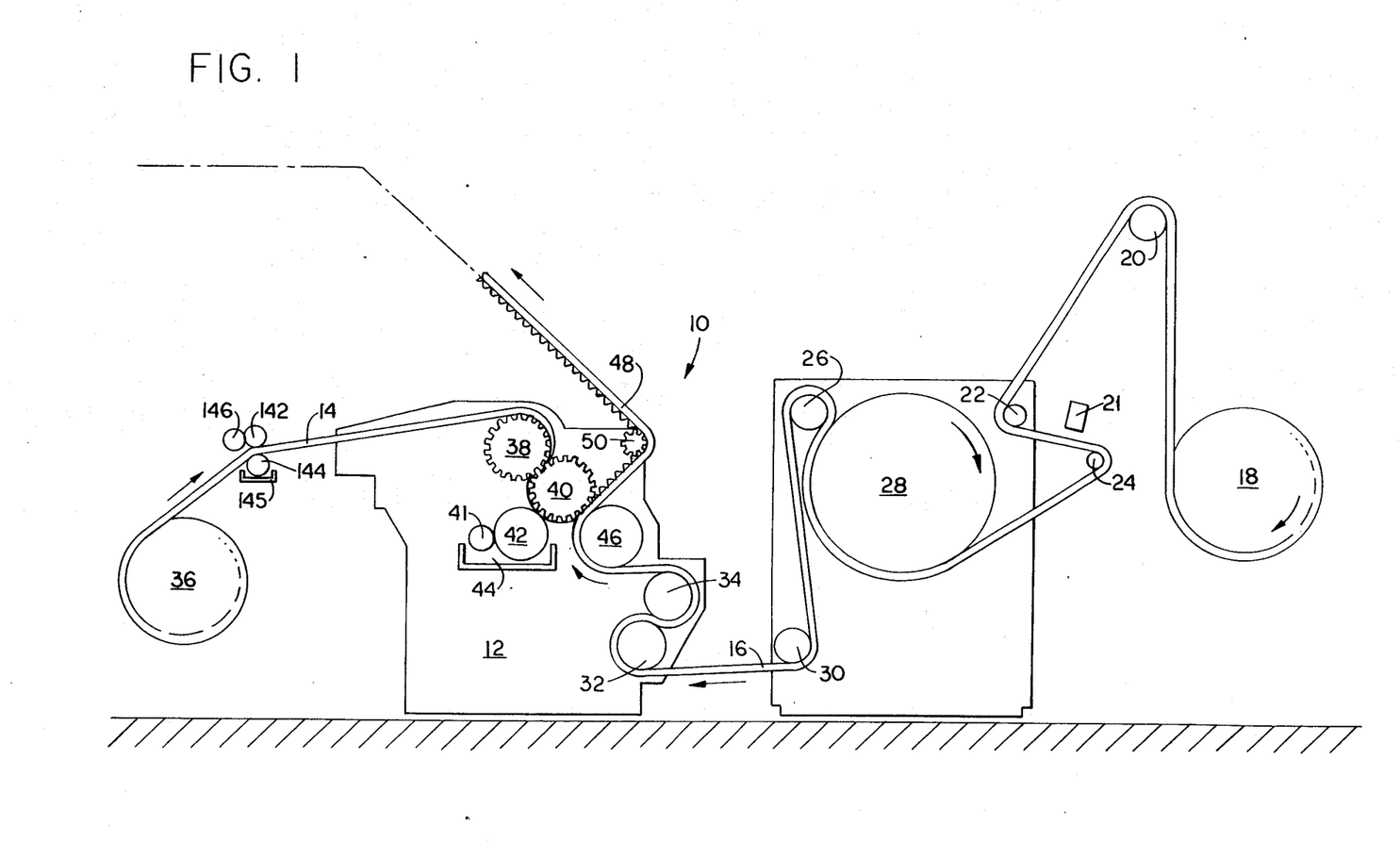
FIG. 1 is a diagramatic depiction of a first single face liner unit with a coating assembly for applying an interlaminate electrostatic shield in accordance with the present invention.

Referring now to the drawings, FIG. 1 shows a first single face corrugating unit 12 of a double wall corrugating machine generally designated by the reference numeral 10. This first single face corrugating unit 12 secures a continuous corrugated paperboard flute 14 to one side of a continuous linerboard 16, and in accordance with the broad aspects of the invention, applies a continuous conductive coating to form an interlaminate electrostatic shield between the linerboard 16 and the corrugated flute 14. The linerboard 16 is preferably paperboard and is continuously supplied from a mill roll stand 18 about a coating path defined by a plurality of idler rollers 20,22 and 24 for contact with a preheater drum 28. Although not shown in the drawings, corrugating units normally have two mill roll stands to permit one stand to be loaded while paperboard is being fed from the other stand. As will be described in greater detail below in connection with FIG. 5, a trailing blade coater assembly 21 is disposed between idler rollers 22 and 24 to apply a flood coating of conductive material, such as carbon black graphite or any of several known conductive coatings, to one interlaminate side of the linerboard 16 to provide the electrostatic shield.

The linerboard 16 of the illustrated arrangement is advanced from the preheater drum 28 about wrap rolls 26 and 30 in a serpentine fashion so as to avoid direct contact between the preheater drum 28 and the coated side of linerboard 16. The linerboard 16 is then directed about a lower preheater 32 and an upper preheater 34. The lower preheater applies heat to the outer side of the linerboard 16 while the upper preheater 34 applies heat against the inner or interlaminate side of the linerboard.

The medium for the corrugated flute 14 is supplied from a mill roll stand 36 to a pair of corrugating rolls 38 and 40. The corrugating rolls 38 and 40 resemble meshing gears and serve to corrugate the interposed medium for use as a flute as the medium 14 passes between the rollers 38,40. An applicator roll 42 partially submerged in a well 44 applies a coating of adhesive to the arches of the corrugated medium 14. A meter roll 41 cooperatively engages the applicator roll 42 to regulate the quantity of adhesive applied to the corrugated medium 14. The adhesive coated corrugating medium is then secured to the electrostatically shielded linerboard 16 as medium 14 and linerboard 16 are compressed in a nip formed by the corrugating roll 40 and a pressure roll 46. As combined, the corrugated medium 14 and linerboard 16 form a single face corrugated liner or web 48 which is then passed about an idler roll 50 to be combined in a doublebacking unit of the corrugating machine 10 depicted in FIG. 3.

Figure 2:
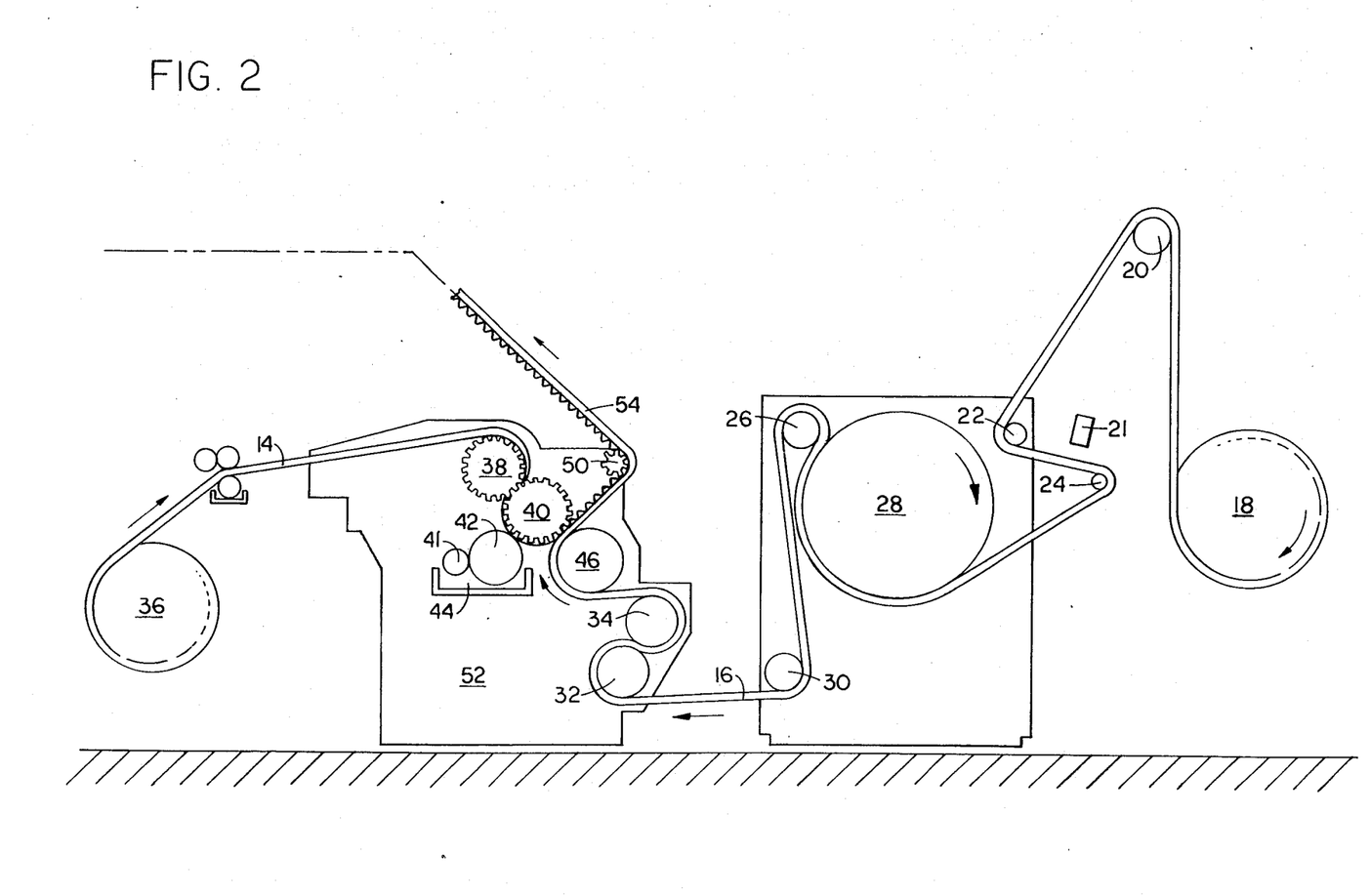
FIG. 2 is a diagramatic depiction of a second single face liner unit similar to the unit of FIG. 1 but positioned downstream thereof.

FIG. 2 depicts a second single face corrugating unit 52 identical to the unit 12 of FIG. 1. The corrugating unit 52 is located downstream of corrugating unit 12 and produces a single face corrugated liner or web 54 with an interlaminate protective coating of conductive material between the linerboard 16 and the corrugated flute 14. Inasmuch as the corrugating unit 52 and associated feed and coating components are identical to the corrugating unit 12 and related components described above, like components will be identified with like reference numbers (except that the single face corrugated liner or web produced therefrom will be identified with the reference number 54) and further description thereof will be omitted in the interests of brevity. It will be readily appreciated, however, that only one of the corrugating units 12,52 are used if a single wall corrugated material is desired. Similarly, three such corrugating units will be used to produce triple wall corrugated material if desired.

Figure 3:
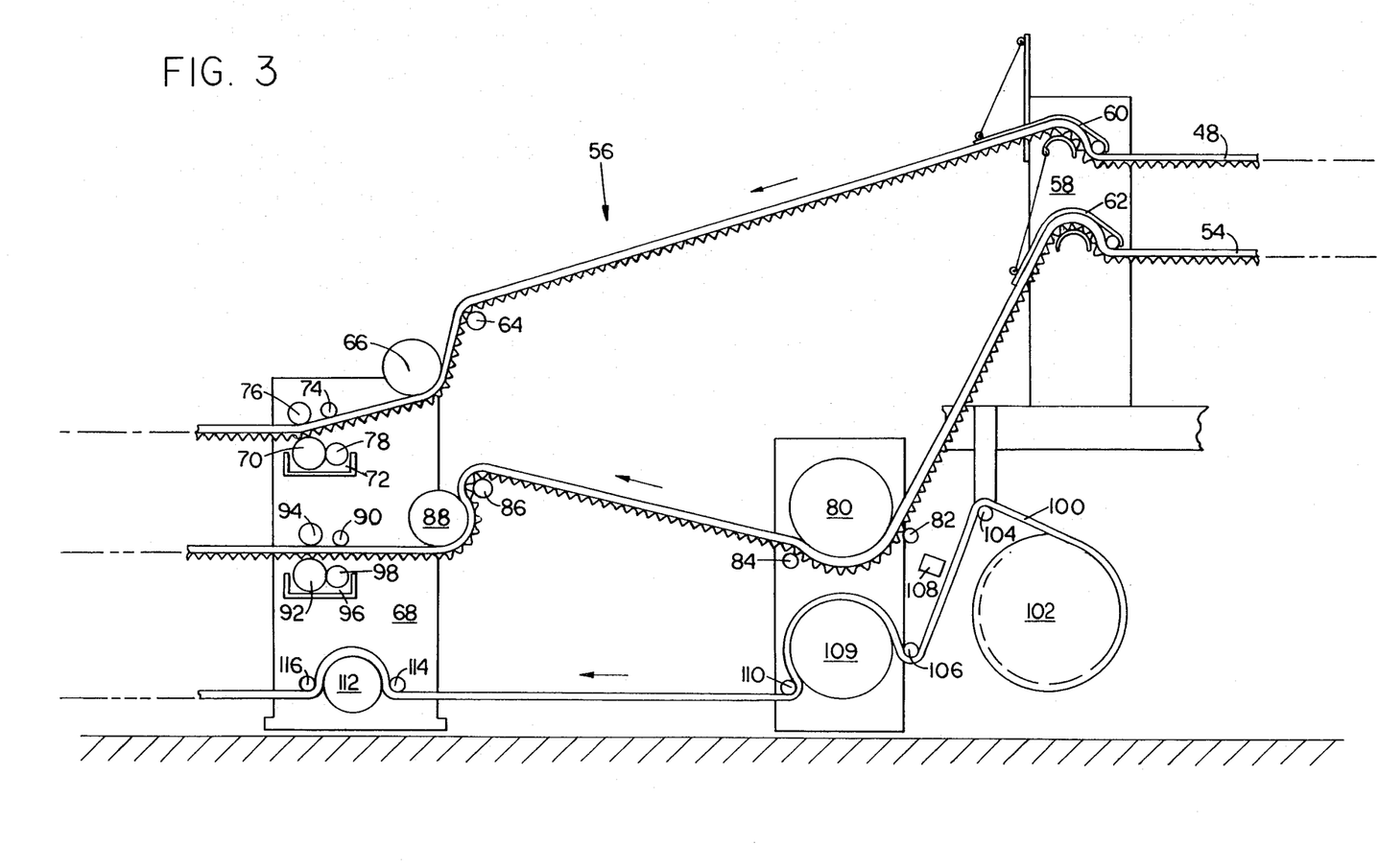
FIG. 3 is a diagramatic depiction of a doublebacking unit positioned downstream of the single face liner units of FIGS. 1 and 2 for receiving and combining the two single face corrugated webs with a doubleback liner.

Turning now to FIG. 3, a doublebacking unit 56 is shown for receiving and combining the single face webs 48 and 54 having interlaminate protective shields produced in the corrugating units 12 and 56 of FIGS. 1 and 2 respectively. Both single face webs 48 and 54 are received by a bridge 58 having paper guides 60 and 62 for receiving the respective webs 48 and 54. After passing through paper guide 60, web 48 is directed about an idler roll 64 and a preheater roll 66 to a glue machine 68. In the glue machine 68, an applicator roll 70, partially submerged in a well 72, applies a coating of adhesive to the arches of the corrugated medium secured to web 48. A wrap roll 74 directs the web 48 into a nip formed between the applicator roll 70 and an adjacent rider roll 76. A meter roll 78 cooperates with the applicator roll 70 to control the quantity of adhesive applied to the liner 48.

In a similar manner, the single face web 54 is directed from the paper guide 62 about a preheating roll 80. Wrap rolls 82 and 84 are located upstream and downstream respectively of the preheating roll 80 to insure sufficient contact with the preheating roll 80 during this travel. After passing about an idler roll 86, the web 54 is directed from the preheater 80 to a further preheating roll 88 and into the glue machine 68. A wrap roller 90 directs the web 54 into a nip formed by an applicator roll 92 and a rider roll 94, the applicator roll being partially submerged in a well 96. The applicator roll 92 applies an adhesive to the arches of the corrugating medium of web 54 and has a cooperating meter roll 98 to regulate the amount of applied adhesive.

FIG. 3 also shows a doubleback liner 100, also preferably formed of paperboard, fed from a mill roll stand 102. The liner 100 is directed from the mill roll stand 102 across an idler roller 104. The idler roller 104 may also be used as a splice roller to establish continuity between successive rolls of liner medium 100. The liner 100 is directed from the idler roller 104 to a wrap roller 106 through a coating assembly including a trailing blade coater 108. As depicted more clearly in FIG. 5, the coater 108 is a flood type coater and applies a continuous conductive coating to one side of the liner 100.

The now coated liner 100 is then passed about the wrap roller 106 onto a preheater roll 109 and a downstream wrap roller 110 to a further preheating roll 112 disposed in the glue machine 68. Idler rollers 114 and 116 are positioned on the upstream and downstream sides respectively of the preheating roll 112.

Figure 4:
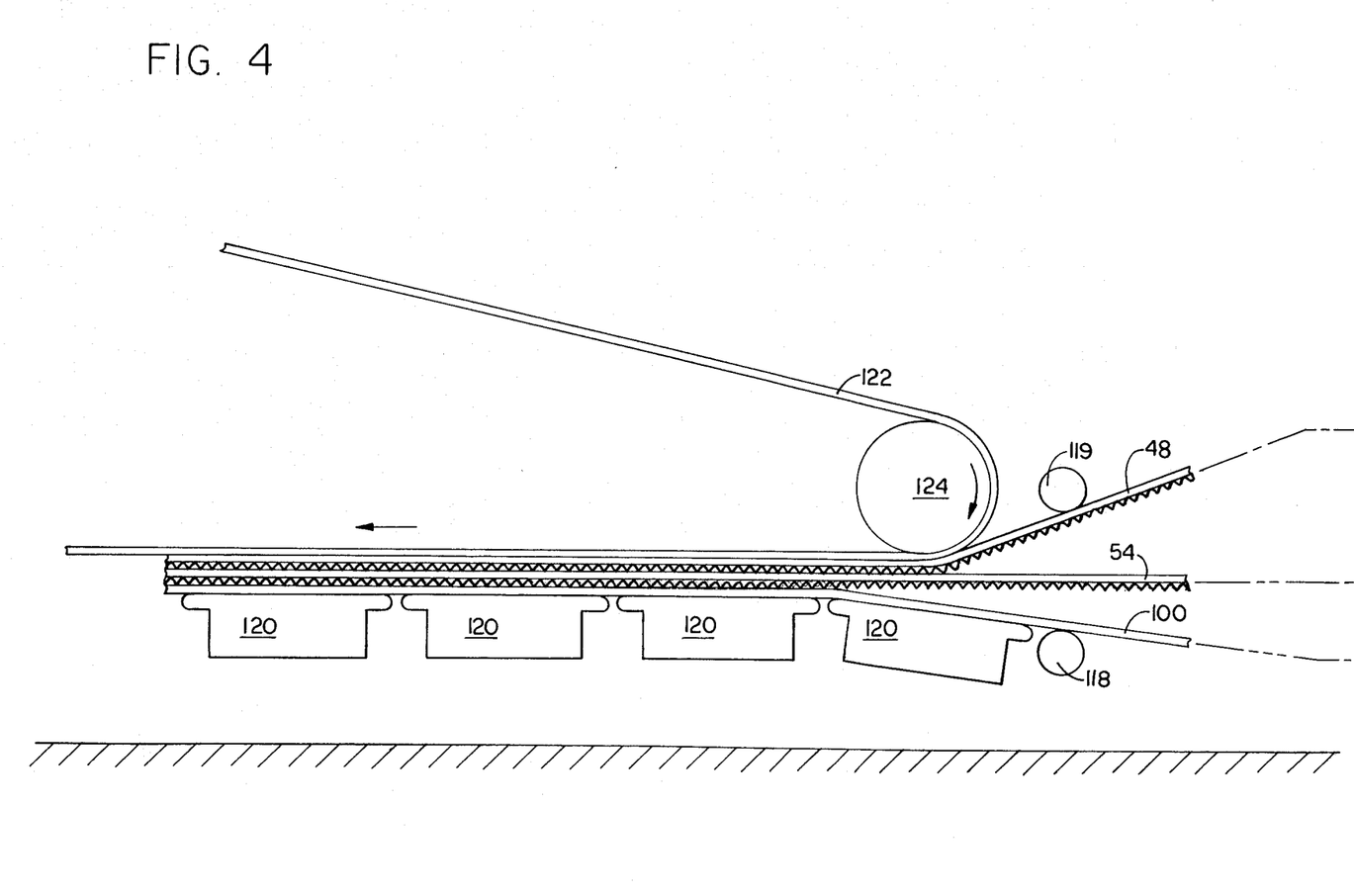
FIG. 4 is a diagramatic depiction of a steam chest arrangement for heating and bonding the single face webs produced in the units of FIGS. 1 and 2 into a single laminated double wall corrugated panel.

FIG. 4 depicts a steam chest arrangement for receiving and combining the adhesive covered single webs 48,54 and the doubleback liner 100 into a single laminated panel. The doubleback liner 100 is directed from the idler roller 116 (FIG. 3) over a guiding roller 118 onto a plurality of serially aligned steam chests 120. The single face web 54 is directed from the glue machine 68 (FIG. 3) to a position on top of the liner 100 with its adhesive covered corrugated medium adjacent the liner 100. The single face web 48 is directed from the glue machine 68 (FIG. 3) by a guiding roller 119 to a position on top of the single face web 54, the adhesive covered corrugated medium of web 48 being adjacent to the liner layer of the web 54. A double face contact belt 122 with an end roller 124 compress the moving webs 48,54 and liner 100 together to form a double wall corrugated packaging material as a single laminate structure.

Figure 5:
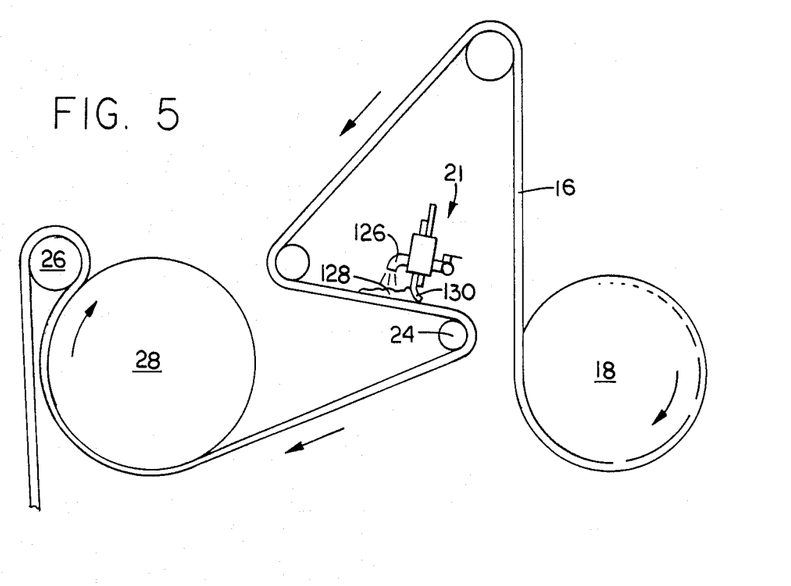
FIG. 5 is an enlarged diagramatic depiction of the flood type coating assembly used to apply the interlaminate conductive coating to the linerboards in FIGS. 1 and 2.

The trailing blade coating assembly 21 for applying a conductive coating to linerboards 16 in FIGS. 1 and 3 is shown in greater detail in FIG. 5. The assembly 21 includes a nozzle 126 for supplying a copious quantity of coating 128 on the upstream side of a blade 130, which blade 130 may be either rigid or pliant. As depicted in FIG. 5, blade 130 is pliant and flexes in response to an interface force with the moving linerboard 16. The coating assembly 21 of the preferred embodiment is a Wet End Coater Model 100 Series commercially available from Michelman Chemicals, Inc. of Cincinnati, Ohio. This type of coating assembly not only fits more readily into a dense packing arrangement of the typical corrugating machine than printing equipment, it adds greater simplicity and substantial cost savings.

The illustrated coating assembly 21 is advantageously positioned upstream of the preheater 28 so as to apply the coating 128 before the linerboard 16 is heated. It should be clear, however, that other positions of the coating assembly, such as downstream of the preheater, are possible and may be preferable in some situations. The conductive coating of the preferred embodiment is a water based emulsion having approximately 40% polymer/carbon black content. Significantly, it has been found that this conductive coating does not interfere with the starch glue bonding between the arches of the corrugated flute medium 14 and the linerboard 16. It should be clear, however, that other conductive coatings may be advantageously used in accordance with the invention.

The coating 128 is applied to the same side of the linerboard 16 as the corrugated flute 14. Thus, as noted above, the coating 128 is disposed in the interlaminate structure of the single face web 48 or 54, protected against physical damage and rub-off.

Figure 6:
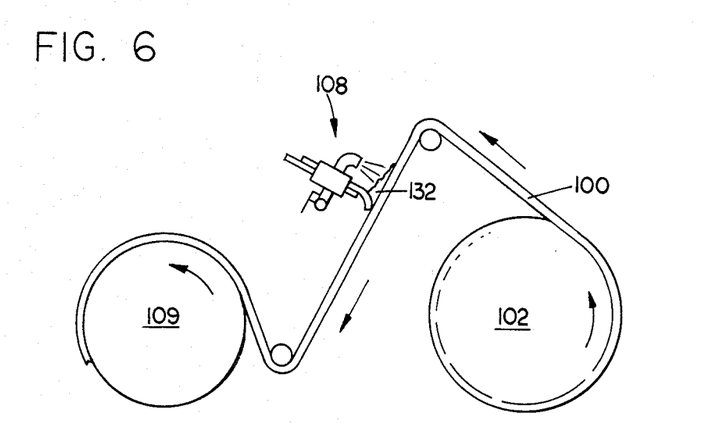
FIG. 6 is an enlarged diagramatic depiction of a flood type coating assembly for applying the interlaminate conductive coating to the doubleback liner in FIG. 3.

The assembly 108 (FIGS. 3 and 6) for applying a conductive coating to the doubleback liner 100 is identical to the coating assembly 21 except for the orientation of the assembly 108 with respect to the liner 100. In FIG. 6, the coating assembly 108 applies a coating 132 to the top of the linerboard 100. However, the top of linerboard 100 is laminated to the corrugated flute of web 48 and the conductive coating 132 is once again disposed in the interlaminate structure of the resulting packaging material.

Figure 7:
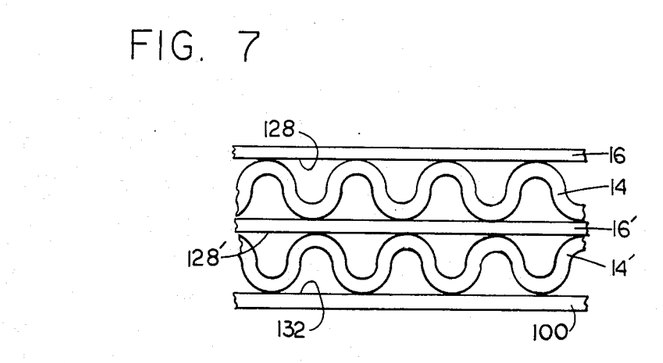
FIG. 7 is a diagramatic cross-sectional depiction of a double wall corrugated panel having three parallel interlaminate electrostatic shields for preventing penetration of electrostatic potential.

FIG. 7 shows a cross-sectional depiction of a double wall corrugated panel constructed in accordance with the present invention. For clarity, the components produced in the single face corrugating unit 52 of FIG. 2 have been differentiated with a prime (') to distinguish from the components produced in the single face corrugating unit 12 of FIG. 1. As illustrated, the laminated panel of FIG. 7 has three separate and independent electrostatic shields (128,128' and 132). Any of the electrostatic shields 128,128' or 132 are independently sufficient for most applications. However, the use of multiple shields may be advantageous for highly critical applications in that backup protection is provided against imperfections or discontinuities in the conductive coatings 128,128' or 132. Moreover, such backup protection may be easily and economically achieved with the present invention. As will be readily appreciated, the individual laminae (14,14', 16,16',100) of the composite laminated structure in FIG. 7 each serve to isolate and protect the physical integrity of the interlaminate coatings (128,128',132). Further, each of the coatings (128,128',132) are isolated from the inside surface of any resulting container and there is no possibility that the coatings will rub off or contaminate a contacting article. Additionally, the surfaces of the composite packing material are totally free of conductive coating. Thus, graphics may be applied to either the inside or outside surfaces of a resulting container and the packaging material is completely reversible in that either surface may be used for the inside or the outside of a container. The electrostatic shield coatings 128,128' and 132 may be formed of different conductive materials, if desired.

Figure 8:
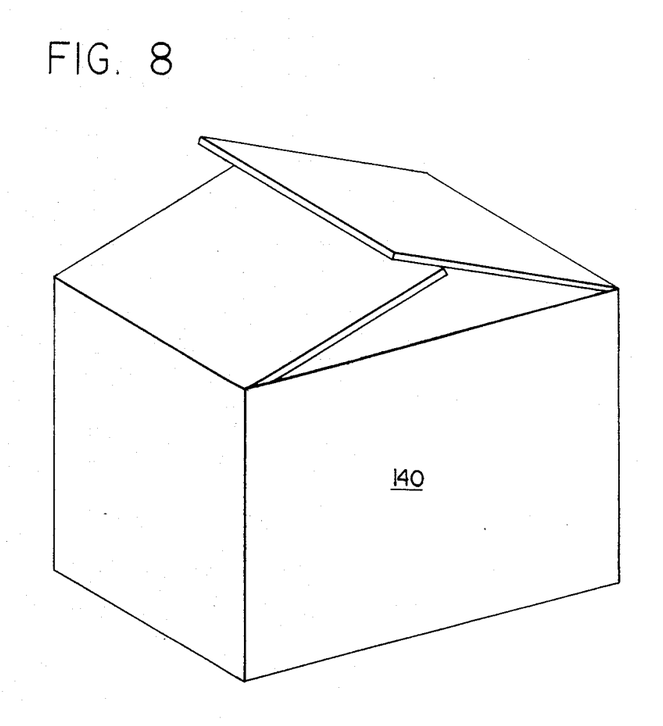
FIG. 8 is a perspective view of a box for transporting electrostatically sensitive components constructed of the double wall corrugated panel produced with the corrugating machine of FIGS. 1-4.

As will be further appreciated by those skilled in the art, the panel of FIG. 7 is erected to the container 140, such as shown in FIG. 8, to store and transport electrostatically sensitive components, such as semiconductor components. When closed, the container 140 completely encapsulates an enclosed article to form a Faraday cage.

Referring once again to FIGS. 1 and 2, an alternate method of applying a conductive coating to the corrugated flute 14 is shown. The paperboard flute medium 14 is directed into the nip of a pair of squeeze rollers 142 and 144 for applying the conductive coating to both sides of the flute medium 14. The squeeze roller 144 is partially submerged in a well 145 and the squeeze roller 142 is in contact with a metering roller 146. The application of conductive coating to the flute medium 14 retains all the advantages of an interlaminate shield discussed above. However, a blade type coating assembly (21,108) is not recommended at this location if the thin flute medium used in most contemporary corrugated applications is used, due to the frailty of that corrugating medium 14 when wet. Further, if the corrugating medium 14 is coated, it is recommended that squeeze type rollers 142,144 be used to impregnate the medium with the coating from both sides. It will be appreciated that the application of a conductive coating to the medium 14 may be used in lieu of or in combination with the application of a conductive coating to the interlaminate side of the linerboard materials.

In summary, numerous benefits have been described which result from employing the concepts of the inventon. The container material of the invention has a conductive coating which is protected against physical contact during manufacture and shipment of the panel as well as erection and loading of a resulting container. Further, the electrostatic shield of the present invention does not hinder the application of graphics and/or decorative coatings to the surface of a resulting container. The use of an interlaminate coating further avoids problems associated with rub-off during handling and transport. Additionally, the use of an interlaminate coating avoids the necessity of using anti-rub additives to the coating formulations and reduces costs accordingly. Moreover, the application of an interlaminate coating is readily compatible with the use of a flood type coating assembly which is substantially less expensive and is readily installable in a conventional corrugated board assembly arrangement.

The foregoing description of a preferred embodiment of the invention has been presented for purposes of illustration and description. It will be readily appreciated that while the illustrated apparatus advantageously includes the placement of a coater assembly to apply a continuous interlaminate coating in a conventional corrugating machine, various other arrangements and materials may be used in accordance with the invention. For example, the invention may be used with solid fiber (without a corrugated medium) or with non-paper lamina. Furthermore, the application of the conductive coating does not necessarily have to be integrated into the laminating process. It is not intended to be exhaustive or to limit the invention to the precise form disclosed. Further modifications or variations are possible in light of the teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A laminated packaging material with an interlaminate electrostatic shield for protecting electrostatically sensitive components from electrostatic potential, comprising:
   (a) a first paperboard lamina;
   (b) a second paperboard lamina, one side of said second lamina being secured about one side of said first lamina to form a laminated structure having a first surface formed by the first paperboard lamina and a second surface formed by the second paperboard lamina; and
   (c) a continuous electrically conductive coating disposed between said first and second lamina with said first and second surfaces being substantially free of the conductive coating whereby said first and second laminae isolate and protect the physical integrity of the interlaminate coating and all surfaces of the laminated material remain substantially free of the coating.

2. A laminated packaging material as recited in claim 1 wherein said conductive coating includes carbon black.

3. A laminated packaging material as recited in claim 1 further including a corrugated flute interposed between said first and second paperboard laminae.

4. A laminated packaging material as recited in claim 3 wherein said continuous conductive coating is applied to an interlaminate side of at least one of said laminae.

5. A laminated packaging material as recited in claim 1 wherein the continuous conductive coating is applied against an interlaminate side of both of said first and second laminae.

6. A laminated packaging material as recited in claim 3 wherein said continuous conductive coating is applied to said corrugated flute.

7. An enclosed container having a Faraday cage completely surrounding the container contents, comprising: a plurality of rigid paperboard panels arranged to completely enclose an interior space, each of said panels including
   (a) a first paperboard lamina:
   (b) a second paperboard lamina, one side of said second lamina being secured about one side of said first lamina to form a laminated structure having a first surface formed by the first paperboard lamina and a second surface formed by the second paperboard lamina; and
   (c) a continuous electrically conductive coating disposed between said first and second laminae with the first and second surfaces being substantially free of the conductive coating whereby said first and second laminae isolate and protect the physical integrity of the interlaminate coating and all surfaces of the laminated material remain substantially free of the coating; whereby the interior space is completely surrounded by a Faraday cage formed by the conductive coating and the conductive coating is protected by the first and second laminae.

8. An enclosed container as recited in claim 7 wherein said conductive coating includes carbon black.

9. An enclosed container as recited in claim 7 further including a corrugated flute interposed between said first and second paperboard.

* * * * *